July 5, 1932.  H. V. JONES  1,866,356
SAW TOOTH
Filed Dec. 1, 1930

INVENTOR:
Homer V. Jones

UNITED STATES PATENT OFFICE

HOMER V. JONES, OF BLOOMINGTON, INDIANA

SAW TOOTH

Application filed December 1, 1930. Serial No. 499,190.

The invention relates to a saw construction having removable teeth and more particularly to the specific method of attaching the individual saw teeth to the body of the saw.

Referring to the accompanying drawing in which similar reference characters indicate similar parts, Figure 1 is a view in perspective of a portion of a saw blade with a block for holding carborundum and a block for holding diamonds fastened thereon in accordance with the present invention.

Figure 1:
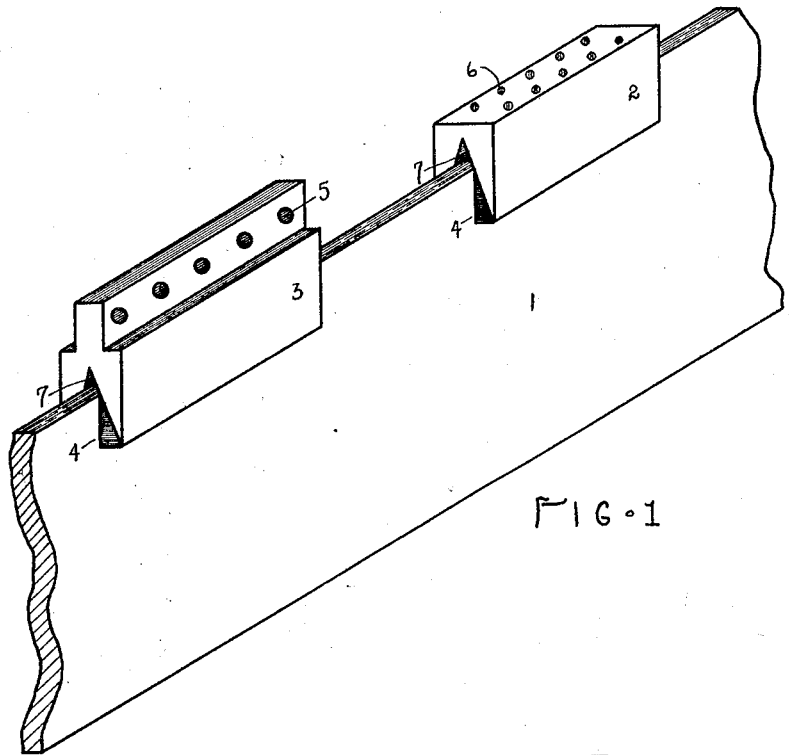
Figure 2:
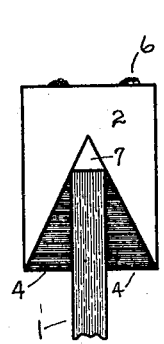
Figure 2 is an end view of the block for holding the diamonds, showing the V-type groove in the rear face, and the fusible material fastening same to the blade.
Figure 3:
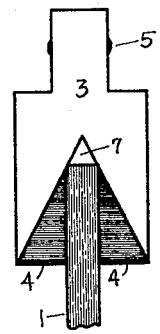
Figure 3 is a section of a saw blade illustrating the end view of the block for holding carborundum cutting elements, showing the V-type groove in the rear face, the fusible material fastening same to the blade, and the manner of protecting the fusible material from wear.

Referring to the drawing in detail, Figure 1 shows a section of a reciprocating blade 1 having attached thereto blocks or saw teeth 2 and 3.

Block or saw tooth 2 has embedded in its cutting face a plurality of diamond cutting elements 6 which are securely affixed thereto by any of the well known methods employed in the art.

Block or saw teeth 3 has affixed in its working faces a plurality of carborundum cutting teeth which are held in the body by any of the well known methods now used in the art.

I do not claim as my invention the exact type or kind of cutting material or the method of attaching the cutting elements to the blocks or teeth. Neither do I limit my invention to the exact arrangement of cutting elements on the face of the block or tooth. These may be of any of the well known types now in use.

My invention is specifically limited to the manner of attaching the blocks or teeth to the saw blade. Each block or tooth has a V-shaped notched cut in its real face, this notch fits over the unbroken edge of the saw blade. The blocks or teeth are firmly affixed to the blade 1 by a fusible material 4. The fusible material 4 is sufficiently hard so as not to melt when the saw heats up during its sawing operation. The sides of the block or tooth protect the fusible material from directly contacting the sides of the groove being cut and thus prevent the fusible material wearing away.

The teeth are shown fastened to a reciprocating blade. The same type of connection may be used on any other type of cutter as a circular saw, a cylindrical saw etc.

And I now make the following claim:

In a stone saw, a saw blade having an unbroken edge, a series of saw-teeth each having a V-shaped notch in its rear face, said notch fitting over the edge of said blade and affixed thereto by fusible material.

In testimony whereof I affix my signature.

HOMER V. JONES.